United States Patent
Roberts et al.

(10) Patent No.: US 8,931,889 B2
(45) Date of Patent: Jan. 13, 2015

(54) INKJET INK WITH SELF-DISPERSED PIGMENTS AND HYDROXYL TERMINATED POLYURETHANE INK ADDITIVES

(75) Inventors: C. Chad Roberts, Hockessin, DE (US); Waifong Liew Anton, Wilmington, DE (US)

(73) Assignee: E I du Pont de Nemours and Company, Wilmington, DE (US)

( * ) Notice: Subject to any disclaimer, the term of this patent is extended or adjusted under 35 U.S.C. 154(b) by 331 days.

(21) Appl. No.: 13/509,141

(22) PCT Filed: Dec. 3, 2010

(86) PCT No.: PCT/US2010/058851
§ 371 (c)(1),
(2), (4) Date: May 10, 2012

(87) PCT Pub. No.: WO2011/069041
PCT Pub. Date: Jun. 9, 2011

(65) Prior Publication Data
US 2012/0218359 A1    Aug. 30, 2012

Related U.S. Application Data

(60) Provisional application No. 61/266,786, filed on Dec. 4, 2009.

(51) Int. Cl.
*B41J 2/01*    (2006.01)
*C09D 11/322*  (2014.01)
*B41J 2/21*    (2006.01)

(52) U.S. Cl.
CPC ............. *C09D 11/322* (2013.01); *B41J 2/2107* (2013.01); *B41J 2/01* (2013.01)
USPC ............................... 347/100; 347/95; 523/160

(58) Field of Classification Search
CPC ............ B41J 2/01; B41J 2/211; B41J 2/1433; B41J 2/17; B41J 2/17593; B41J 2/2107; B41J 2/1755; B41J 2/21141; B41J 11/0015; B41J 2/2056; B41J 2/21; C09D 11/36; C09D 11/40; C09D 11/30; C09D 11/38; C09D 11/322; C09D 11/328; C09D 11/101; C09D 11/005; C09D 11/54; C09D 11/52; B41M 5/011; B41M 5/0017; B41M 7/00
USPC ................. 347/100, 95, 96, 101, 102, 88, 99; 106/31.6, 31.27, 31.13; 523/160, 161
See application file for complete search history.

(56) References Cited

U.S. PATENT DOCUMENTS

| 3,412,054 | A | 11/1968 | Milligan et al. | |
|---|---|---|---|---|
| 5,085,698 | A | 2/1992 | Ma et al. | |
| 5,554,739 | A | 9/1996 | Belmont et al. | |
| 5,571,311 | A | 11/1996 | Belmont et al. | |
| 5,571,331 | A | 11/1996 | Schertler et al. | |
| 5,609,671 | A | 3/1997 | Nagasawa et al. | |
| 5,928,419 | A | 7/1999 | Uemura et al. | |
| 6,852,156 | B2 | 2/2005 | Yeh et al. | |
| 7,101,919 | B2 * | 9/2006 | Hasegawa et al. | 523/160 |
| 7,176,248 | B2 | 2/2007 | Valentini et al. | |
| 7,348,368 | B2 | 3/2008 | Kakiuchi et al. | |
| 7,479,179 | B2 * | 1/2009 | Szajewski | 106/31.6 |
| 2003/0184629 | A1 * | 10/2003 | Valentini et al. | 347/100 |
| 2004/0130608 | A1 | 7/2004 | Campbell et al. | |
| 2005/0054751 | A1 * | 3/2005 | Namba et al. | 347/100 |
| 2005/0176848 | A1 * | 8/2005 | Chen et al. | 347/100 |
| 2007/0100024 | A1 * | 5/2007 | Gu et al. | 106/31.6 |
| 2008/0207811 | A1 | 8/2008 | Brust et al. | |
| 2008/0318009 | A1 * | 12/2008 | Berge et al. | 428/195.1 |
| 2009/0192261 | A1 | 7/2009 | Anton | |
| 2009/0259012 | A1 | 10/2009 | Roberts | |
| 2011/0288212 | A1 * | 11/2011 | Deiner et al. | 347/100 |

FOREIGN PATENT DOCUMENTS

| EP | 146090 A2 | 3/1992 | | |
|---|---|---|---|---|
| EP | 1114851 A1 | 7/2001 | | |
| EP | 1158030 A2 | 11/2001 | | |
| JP | 2009-051926 A | 3/2009 | | |
| WO | WO 8705924 A1 * | 10/1987 | | C09D 11/00 |

OTHER PUBLICATIONS

Corresponding case PCT/US 10/58851, International Search Report, US Patent Office, Alexandria, VA, Authorized Lee W. Young, Jan. 13, 2011.
Supplementary European Search Report, EP 10835170.1 / 2 507 329, EP counterpart of the present application, European Patent Office, Munich, Germany, Jan. 30, 2014.

* cited by examiner

*Primary Examiner* — Manish S Shah
(74) *Attorney, Agent, or Firm* — John H. Lamming

(57) ABSTRACT

An ink for inkjet is provided for printing, comprising a self-dispersed pigment colorant and certain hydroxyl terminated polyurethanes derived from polyether diols which enhances fastness of the print towards highlighter and finger smudge without compromising jetting performance and storage stability of the ink.

17 Claims, No Drawings

INKJET INK WITH SELF-DISPERSED PIGMENTS AND HYDROXYL TERMINATED POLYURETHANE INK ADDITIVES

CROSS-REFERENCE TO RELATED APPLICATION

This application claims priority under 35 U.S.C. §119 from U.S. Provisional Application Ser. No. 61/266,786, filed Dec. 4, 2009.

BACKGROUND OF THE INVENTION

This invention pertains to an inkjet ink, in particular to an aqueous inkjet ink comprising self-dispersible pigments and selected polyurethanes ink additives and to methods of using these in inkjet inks.

Pigments suitable for aqueous inkjet inks are in general well-known in the art. Traditionally, pigments were stabilized by dispersing agents, such as polymeric dispersants or surfactants, to produce a stable dispersion of the pigment in the vehicle. More recently "self-dispersible" or "self-dispersed" pigments (hereafter "self-dispersed pigment") have been developed. Self-dispersed pigments are dispersible in water without dispersants.

Self-dispersed pigment is often advantageous over traditional dispersant stabilized pigments due to greater stability and lower viscosity at the same pigment loading. This can provide greater formulation latitude in final ink.

Prints made with self-dispersed pigment ink, however, tend to be susceptible to rub off and poor highlighter resistance. The combination of self-dispersed pigment and dispersant stabilized pigment to improve image properties is taught in EP 1158030 and discloses the use of a CABOJET™ 200 results in poor performance to highlighter resistance. In EP 1114851, a sulfonated C.I. Pigment Red 122 is disclosed to have poor rubbing/scratch resistance when a highlighter pen was rubbed over the printed characters.

Polyurethanes have been described as ink additives in U.S. Pat. No. 7,176,248 and U.S. Patent Application Publication No. 2005/0176848. However, neither describes the combination of self-dispersed pigment and the polyurethanes derived from polyether diols where there is an excess of isocyanate reactive groups.

In U.S. Pat. No. 7,348,368 polyurethanes are described for use as additives to ink jet inks and these are used with polymerically dispersed pigments and acid numbers of greater than 50. In U.S. Patent Application Publication No. 2008/0207811 polyurethanes are described with acid numbers above 60 and have extensive examples with polymerically dispersed pigments. However, none of these describes the combination of self-dispersed pigment and the hydroxyl terminated polyurethanes with acid numbers below 50 which are derived from polyether diols that have at least 3 carbons atoms in the repeating ether group.

While inks based on aqueous dispersions with polyurethane additives have provided improved ink jet inks for many aspects of ink jet printing, a need still exists for improved inkjet ink formulations of self-dispersed pigment that provide good print quality and good jettability in particular when printed from a thermal ink jet printhead. It is well known to those of ordinarily skill in the art that thermal ink jet printhead has lower tolerance towards the addition of polymer additives on its jettability and reliability compared to piezo ink jet printhead. The present invention satisfies this need by providing compositions having improved optical density, while maintaining other aspects of the ink, dispersion stability, long nozzle life and the like.

SUMMARY OF THE INVENTION

An embodiment of the invention provides the addition of a hydroxyl terminated polyurethane derived from polyether diols to an aqueous ink comprising self-dispersed colorant to provide improved fastness of the printed image without compromising jetting performance.

A further, embodiment provides improving the jetting performance of an ink comprising a self-dispersed pigment by the adding a hydroxyl terminated polyurethane derived from polyether diols.

A further embodiment provides an aqueous inkjet ink composition comprising:
a. a self-dispersed pigment colorant;
b. an aqueous vehicle; and
c. a hydroxyl terminated polyurethane comprising a polyether diol, a diol substituted with an ionic group, and isocyanates,
wherein the polyether dial is $Z_1$

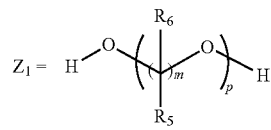

wherein p is greater than or equal to 2;
m is 3 to about 12;
each $R_5$ and $R_6$ is independently selected from the group consisting of hydrogen, alkyl, substituted alkyl, and aryl; each $R_5$ or $R_6$ is the same or different, and $R_5$ and $R_6$ may be optionally joined to form a cyclic structure;
the diol substituted with an ionic group is $Z_2$, and at least one $Z_1$ and at least one $Z_2$ must be present in the polyurethane composition;
equivalents of isocyanate reactive groups derived from the $Z_1$ and $Z_2$ are greater than isocyanate groups leading to hydroxyl terminated polyurethanes;
and the polyurethane has an acid number of at least 10 to 50.

A further embodiment, wherein the ink jet ink may optionally contain other additives and adjuvants well-known to those of ordinary skill in the art.

A further embodiment, wherein the self-dispersed colorant comprises a pigment that has been oxidatively treated on its surface with hypochlorous acid, sulfonic acid, or ozone so as to bond at least one functional group selected from the group consisting of carbonyl, carboxyl, hydroxyl and sulfone, onto the surface of the pigment.

In yet another embodiment the self-dispersed pigment is self-dispersed carbon black pigment comprising anionic hydrophilic chemical groups.

Within yet another embodiment an aqueous pigmented ink jet ink comprising a self-dispersed pigment with a polyurethane ink additive, having from about 0.05 to about 5 wt % polyurethane ink additive based on the total weight of the ink, having from about 0.1 to about 10 wt % pigment based on the total weight of the ink, a surface tension in the range of about 20 dyne/cm to about 70 dyne/cm at 25° C., and a viscosity of lower than about 30 cP at 25° C.

Another embodiment provides an inkjet ink set for color printing, comprising at least three differently colored inks (such as CMY), and suitably at least four differently colored inks (such as CMYK), wherein at least one of the inks is an aqueous inkjet ink with the self-dispersed pigment and the polyurethane described above.

Yet another embodiment provides the combination of self-dispersed pigments and the selected polyurethane ink additives to produce inks such that when images are printed, the images have optical densities which are improved over self-dispersed pigments. These improvements enable the success of ink jet inks in making high color images, especially for photo printing. The combination of self-dispersed pigments and the selected polyurethane ink additives produce inks that are more stable and can be jetted from both piezo and thermal ink jet cartridges.

In another embodiment the ink sets in accordance with the present invention comprise at least three differently colored inks (such as CMY), and optionally at least four differently colored inks (such as CMYK), wherein at least one of the inks is an aqueous inkjet ink comprising:
  (a) a self-dispersed colorant;
  (b) an aqueous vehicle; and
  (c) a polyurethane derived from polyether dials, diol substituted with an ionic group and isocyanates as set forth above.

An embodiment provides the ink set comprising at least 4 different colored inks (CMYK), wherein the black (K) ink comprises:
  (a) a black self-dispersed pigment colorant;
  (b) an aqueous vehicle; and
  (c) a polyurethane derived from a polyether diol, diol subs with an ionic group, and isocyanates as set forth above.

The other inks of the ink set are suitably also aqueous inks, and may contain dyes, pigments or combinations thereof as the colorant. Such other inks are, in a general sense, well known to those of ordinary skill in the art.

In another aspect, the disclosure provides a method of ink jet printing onto a substrate comprising, in any workable order, the steps of:
  (a) providing an ink jet printer that is responsive to digital data signals;
  (b) loading the printer with a substrate to be printed;
  (c) loading the printer with an ink jet ink comprising an aqueous ink vehicle, a self-dispersed pigment and a hydroxyl terminated polyurethane comprising a polyether diol, a diol substituted with an ionic group, and isocyanates as described above;
  (d) printing onto the substrate using the aqueous ink jet ink, in response to the digital data signals to form a printed image on the substrate.

In yet another aspect, the disclosure provides a method of ink jet printing onto a substrate comprising, in any workable order, the steps of:
  (a) providing an ink jet printer that is responsive to digital data signals;
  (b) loading the printer with a substrate to be printed;
  (c) loading the printer with an ink jet ink set where at least one of the inks in the ink set comprises an aqueous ink vehicle, a self-dispersed pigment and a hydroxyl terminated polyurethane comprising a polyether diol, a diol substituted with an ionic group, and isocyanates as described above;
  (d) printing onto the substrate using the aqueous ink jet ink, in response to the digital data signals to form a printed image on the substrate.

These and other features and advantages of the present invention will be more readily understood by those of ordinary skill in the art from a reading of the following Detailed Description.

Certain features of the invention which are, for clarity, described above and below as separate embodiments, may also be provided in combination in a single embodiment. Conversely, various features of the invention that are described in the context of a single embodiment may also be provided separately or in any subcombination.

DETAILED DESCRIPTION

Unless otherwise stated or defined, all technical and scientific terms used herein have commonly understood meanings by one of ordinary skill in the art to which this invention pertains.

Unless stated otherwise, all percentages, parts, ratios, etc., are by weight.

When an amount, concentration, or other value or parameter is given as either a range, preferred range or a list of upper preferable values and lower preferable values, this is to be understood as specifically disclosing all ranges formed from any pair of any upper range limit or preferred value and any lower range limit or preferred value, regardless of whether ranges are separately disclosed. Where a range of numerical values is recited herein, unless otherwise stated, the range is intended to include the endpoints thereof, and all integers and fractions within the range.

When the term "about" is used in describing a value or an end-point of a range, the disclosure should be understood to include the specific value or end-point referred to.

As used herein, reference to enhanced or improved "print quality" means some aspect of optical density of the printed images and fastness (resistance to ink removal from the printed image) is increased, including, for example, rub fastness (finger rub), water fastness (water drop) and smear fastness (highlighter pen stroke).

As used herein, the term "self-dispersed pigment" means a self-dispersible" or "self-dispersing" pigments.

As used herein, the term "dispersion" means a two phase system where one phase consists of finely divided particles (often in the colloidal size range) distributed throughout a bulk substance, the particles being the dispersed or internal phase and the bulk substance the continuous or external phase.

As used herein, the term "dispersant" means a surface active agent added to a suspending medium to promote uniform and maximum separation of extremely fine solid particles often of colloidal size. For pigments the dispersants are most often polymeric dispersants and usually the dispersants and pigments are combined using dispersing equipment.

As used herein, the term "OD" means optical density.

As used herein, the term "degree of functionalization" refers to the amount of hydrophilic groups present on the surface of the self-dispersed pigment per unit surface area.

As used herein, the term "aromatic" means a cyclic hydrocarbon containing one or more rings typified by benzene which has a 6 carbon ring containing three double bonds. Aromatic includes cyclic hydrocarbons such as naphthalene and similar multiple ring aromatic compounds.

As used herein, the term "alkyl" means a paraffinic hydrocarbon group which may be derived from an alkane and the formula is $C_nH_{2n+1}$. A substituted alkyl may have any substitution including hetero atoms substitutions such as carboxyl, amine hydroxyl.

As used herein, the term "aralkyl" means an aryl group which is substituted with an alkyl group.

As used herein, the term "aqueous vehicle" refers to water or a mixture of water and at least one water-soluble organic solvent (co-solvent).

As used herein, the tem "ionizable groups" means potentially ionic groups. As used herein, the term "AN" means acid number, mg KOH/gram of solid polymer.

As used herein, the term "neutralizing agents" means to embrace all types of agents that are useful for converting ionizable groups to the more hydrophilic ionic (salt) groups.

As used herein, the term "substantially" means being of considerable degree, almost all.

As used herein, the term "Mn" means number average molecular weight.

As used herein, the term "Mw" means weight average molecular weight.

As used herein, the term "Pd" means the polydispersity which is the weight average molecular weight divided by the number average molecular weight.

As used herein, the term "d50" means the particle size at which 50% of the particles are smaller; "d95" means the particle size at which 95% of the particles are smaller.

As used herein, the term "cP" means centipoise, a viscosity unit.

As used herein, the term "pre-polymer" means the polymer that is an intermediate in a polymerization process, and can be also be considered a polymer.

As used herein, the term "PUD" means the polyurethanes dispersions described herein.

As used herein, the term "DBTL" means dibutyltin dilaurate.

As used herein, the term "DMPA" means dimethylol propionic acid.

As used herein, the term "DMBA" means dimethylol butyric acid.

As used herein, the term "EDTA" means ethylenediaminetetraacetic acid.

As used herein, the term "HDI" means 1,6-hexamethylene diisocyanate.

As used herein, the term "GPC" means gel permeation chromatography.

As used herein, the term "IPDI" means isophorone diisocyanate.

As used herein, the term "TMDI" means trimethylhexamethylene diisocyanate.

As used herein, the term "TMXDI" means m-tetramethylene xylylene diisocyanate.

As used herein, the term "ETEGMA/BZMA//MAA" means the block copolymer of ethoxytriethyleneglycol methacrylate, benzylmethacrylate and methacrylic acid.

As used herein the term T650 means TERATHANE® 650.

As used herein, the term "PO3G" means 1,3-propanediol.

As used herein, the term "DMPA" means dimethylol propionic acid.

As used herein, the term "NMP" means n-Methyl pyrrolidone.

As used herein, the term "TEA" means triethylamine.

As used herein, the term "TEOA" means triethanolamine.

As used herein, the term "THF" means tetrahydrofuran.

As used herein, the term "Tetraglyme" means Tetraethylene glycol dimethyl ether.

Unless otherwise noted, the above chemicals were obtained from Aldrich (Milwaukee, Wisc.) or other similar suppliers of laboratory chemicals.

TERATHANE 650 is a 650 molecular weight, polytetramethylene ether glycol (PTMEG) from purchased from Invista, Wichita, Ks.

TERATHANE 250 is a 250 molecular weight, polytetramethylene ether glycol.

The materials, methods, and examples herein are illustrative only and, except as explicitly stated, are not intended to be limiting.

While seeking a balance of performance parameters needed to broaden the utility of self-dispersed pigments for use in ink jet inks, it was found that polyurethanes additives in combination with self-dispersed pigment could improve printing properties and the durability of the prints. When the polyurethane additive properties were carefully chosen inks with self-dispersed pigment and specific polyurethane additives could not only lead to good print properties, but have the requisite properties to perform in all ink jet jetting systems. This combination requires that the polyurethane additive have a low acid value and be derived from polyether dials where there are at least 3 carbons in the repeating ether unit. Apparently, these polyether diols are more hydrophobic than polyethers derived from oxides such as ethylene oxide, and impart improved properties to the inks. Also, the polyurethane has hydroxyl terminal groups. The equivalents of the isocyanate reactive groups from the polyether diol and dial substituted with an ionic group are greater than the isocyanate groups leading to hydroxyl terminated polyurethanes.

Colorant

The pigment colorants of the present invention are self-dispersing pigments. Self-dispersed pigments are surface modified with dispersibility imparting groups to allow stable dispersion without the need for a separate dispersant. For dispersion in an aqueous vehicle, the surface modification involves addition of hydrophilic groups, more specifically, ionizable hydrophilic groups. Methods of making self-dispersed pigments are well known and can be found for example in U.S. Pat. No. 5,554,739 and U.S. Pat. No. 6,852,156.

The self-dispersed pigment colorant can be further characterized according to its ionic character. Anionic self-dispersed pigment yields, in an aqueous medium, particles with anionic surface charge. Conversely, cationic self-dispersed pigment yields, in an aqueous medium, particles with cationic surface charge. Particle surface charge can be imparted, for example, by attaching groups with anionic or cationic moieties to the particle surface. The self-dispersed pigment of the present invention have, although not necessarily, anionic hydrophilic chemical groups.

Anionic moieties attached to the anionic self-dispersed pigment surface can be any suitable anionic moiety but are preferably compounds (A) or (B) as depicted below:

—CO₂Y (A)

—SO₃Y (B)

where Y is selected from the group consisting of conjugate acids of organic bases; alkali metal ions; "onium" ions such as ammonium, phosphonium and sulfonium ions; and substituted "onium" ions such as tetraalkylarrimanium, tetraalkyl phosphonium and trialkyl sulfonium ions; or any other suitable cationic counterion. Useful anionic moieties also include phosphates and phosphonates More suitable are type A ("carboxylate") anionic moieties which are described, for example, in U.S. Pat. No. 5,571,311, U.S. Pat. No. 5,609,671 and U.S. Pat. No. 6,852,156; Alternatively, sulfonated self-dispersed pigments may be used and have been described, for example, in U.S. Pat. No. 5,571,331; U.S. Pat. No. 5,928,419; and EP 146090 A1.

Small colorant particles should be used for maximum color strength and good jetting. The particle size of the self-dispersed pigments reported as d50 may generally be in the range of from about 50 nanometers to about 500 nanometers; more specifically, in the range of from 75 to about 250 nanometers, more specifically from about 100 to about 200 nanometers.

The levels of self-dispersed pigments employed in the inks instant invention are those levels needed to impart the desired optical density to the printed image. Self-dispersed pigment levels may be in the range of about 0.01 to about 10% by weight of the ink.

The self-dispersed pigments may be black, such as those based on carbon black, or may be colored pigments such as those based on the American Association of Textile Chemists and Colorists Color Index pigments such as Pigment Blue PB15:3 and PB15:4 cyan, Pigment Red PR122 and PR123 magenta, and Pigment Yellow PY128 and PY74 yellow.

The self-dispersed pigments used in the present invention may be prepared, for example, by grafting a functional group or a molecule containing a functional group onto the surface of the pigment, or by physical treatment (such as vacuum plasma), or by chemical treatment (for example, by oxidation with ozone, hypochlorous acid or the like). A single type or a plurality of types of hydrophilic functional groups may be bonded to one pigment particle. The type and degree of functionalization may be properly determined by taking into consideration, for example, dispersion stability in ink, color density, and drying properties at the front end of an ink jet printhead.

In one embodiment, the anionic hydrophilic chemical groups on the self-dispersed pigment are primarily carbonyl, carboxyl, hydroxyl groups, or a combination of carboxyl, carbonyl and hydroxyl groups; more specifically, the hydrophilic functional groups on the self-dispersed pigment are directly attached and are primarily carboxyl groups, or a combination of carboxyl and hydroxyl.

Pigments having the hydrophilic functional group(s) directly attached may be produced, for example, according to methods disclosed in U.S. Pat. No. 6,852,156. Carbon black treated by the method in U.S. Pat. No. 6,852,156 has a high surface-active hydrogen content which is base neutralized to provide stable dispersions in water. The oxidant is ozone.

The self-dispersed pigments of the present invention may have a degree of functionalization wherein the density of anionic groups is less than about 3.5 μmoles per square meter of pigment surface (3.5 μmole/m$^2$), and more specifically, less than about 3.0 μmol/m$^2$. Degrees of functionalization of less than about 1.8 μmol/m$^2$, and more specifically, less than about 1.5 μmol/m$^2$, are also suitable and may be useful for certain specific types of self-dispersed pigments.

Polyurethanes Ink Additives

The hydroxyl terminated polyurethane ink additive is derived from a polyether diol, a diol substituted with an ionic group, and isocyanate where the polyether diol is $Z_1$.

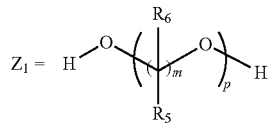

wherein p is greater than or equal to 2;
m is 3 to about 12;
each $R_5$ and $R_6$ is independently selected from the group consisting of hydrogen, alkyl, substituted alkyl, and aryl; each $R_5$ or $R_6$ is the same or different, and $R_5$ and $R_6$ may be optionally joined to form a cyclic structure;
the diol substituted with an ionic group is $Z_2$, and at least one $Z_1$ and at least one $Z_2$ must be present in the polyurethane composition;
equivalents of isocyanate reactive groups derived from the $Z_1$ and $Z_2$ are greater than isocyanate groups leading to hydroxyl terminated polyurethanes;
and the polyurethane has an acid number of at least 10 to 50.

The hydroxyl terminated polyurethane ink additive is a polyurethane dispersion and is distinct from other components added to the ink. The term "polyurethane dispersion" refers to aqueous dispersions of polymers containing urethane groups and optionally urea groups, as that term is understood by those of ordinary skill in the art. These polymers also incorporate hydrophilic functionality to the extent required to maintain a stable dispersion of the polymer in water. The $Z_2$ diol containing the ionic group provides the ionic stabilization for the polyurethane dispersion.

The steps in the preparation of a hydroxyl terminated polyurethane ink additive comprises the steps:
(a) providing reactants comprising (i) at least one polyether diol $Z_1$ component, (ii) at least one polyisocyanate component comprising a diisocyanate, and (iii) at least one hydrophilic reactant comprising at least one isocyanate reactive component containing an ionic group, $Z_2$;
(b) reacting (i), (ii) and (iii) in the presence of a water-miscible organic solvent to form an isocyanate-functional polyurethane pre-polymer;
(c) adding water to form an aqueous dispersion; and
$Z_2$ contains ionizable groups and at the time of addition of water (step (c)), the ionizable groups may be ionized by adding acid or base (depending on the type of ionizable group) in an amount such that the polyurethane can be stably dispersed. This neutralization can occur at any convenient time during the preparation of the polyurethane.

At some point during the reaction (generally after addition of water and after chain termination), the organic solvent is substantially removed under vacuum to produce an essentially solvent-free dispersion.

It should be understood that the process used to prepare the polyurethane generally results in a polyurethane polymer of the above structure being present in the final product. However, the final product will typically be a mixture of products, of which a portion is the above polyurethane polymer, the other portion being a normal distribution of other polymer products and may contain varying ratios of unreacted monomers. The heterogeneity of the resultant polymer will depend on the reactants selected as well as reactant conditions chosen.

Polyether Diol Component of the Hydroxyl Terminated Polyurethane Ink Additive

The diol component $\{Z_1\}$ is based on a polyether diol with 3 to 12 methylene groups (m=3 to 12). The polyether diol can be used individually or in mixtures with other dials.

In one embodiment, the polyether diol shown as $Z_1$ may be blended with other oligomeric and/or polymer polyfunctional isocyanate-reactive compounds such as, for example, polyols, polyamines, polythiols, polythioamines, polyhydroxythiols and polyhydroxylamines. When blended, it is suitable to use di-functional components and, more suitably, one or more diols including, for example, polyester diols, polycarbonate polyacrylate diols, polyolefin diols and silicone diols.

When p is greater than 1 the polyether diol shown in $Z_1$ are oligomers and polymers in which at least 50% of the repeating units have 3 to 12 methylene groups in the ether chemical groups. More specifically, from about 75% to 100%, still more specifically, from about 90% to 100%, and even more specifically, from about 99% to 100%, of the repeating units are 3 to 12 methylene groups in the ether chemical groups (in $Z_1$ wherein m=3 to 12). A suitable number of methylene groups is 3 or 4. The polyether diol shown in $Z_1$ can be prepared by polycondensation of monomers comprising alpha, omega diols resulting in polymers or copolymers containing the structural linkage shown above. As indicated above, at least 50% of the repeating units are 3 to 12 methylene ether units.

The oligomers and polymers based on the polyether diol have from 2 to 50 repeating groups of the 3 to 12 methylene groups in the alkyl portion of the ether in $Z_1$, that is p may be from 2 to 50. Optionally, p may be from 5 to 20 of the repeating groups of the 3 to 12 methylene groups in the alkyl portion of the ether in $Z_1$. Where p denotes the number of repeating groups each $R_5$ and $R_6$ may be independently hydrogen, alkyl, substituted alkyl, and aryl; $R_5$ and $R_6$ is the same or different and $R_5$ and $R_6$ can may be optionally joined to form a cyclic structure. In general, the substituted alkyls are intended to be inert during the polyurethane preparation.

In addition to the 3 to 12 methylene ether units, lesser amounts of other units, such as other polyalkylene ether repeating units derived from ethylene oxide and propylene oxide may be present. The amount of the ethylene glycols and 1,2-propylene glycols which are derived from epoxides such as ethylene oxide, propylene oxide, butylene oxide, etc are limited to less than 10% of the total polyether diol weight.

The polyether diol may be derived from 1,3-propanediol, (PO3G). The employed PO3G may be obtained by any of the various well known chemical routes or by biochemical transformation routes. The 1,3-propanediol may be obtained biochemically from a renewable source ("biologically-derived" 1,3-propanediol).

When the polyether diol shown as $Z_1$ having p is greater than 1 is provided, the diol may have a number average molecular weight (Mn) in the range of about 200 to about 5000, and more specifically from about 240 to about 3600. Blends of the polyether diol can also be used. For example, the polyether diol shown as $Z_1$ can comprise a blend of a higher and a lower molecular weight, further the polyether diol may have a number average molecular weight of from about 1000 to about 5000, and the lower molecular weight polyether diol may have a number average molecular weight of from about 200 to about 750. The Mn of the blended polyether diol may still be in the range of from about 250 to about 3600. The polyether diol may be suitable for use herein having typically polydisperse, polymers a polydispersity (i.e. Mw/Mn) of suitably from about 1.0 to about 2.2, more specifically, from about 1.2 to about 2.2, and still more specifically, from about 1.5 to about 2.1. The polydispersity can be adjusted by using blends of the polyether diol shown as $Z_1$.

Diol Substituted with an Ionic Group

The diol substituted with an ionic group contains ionic and/or ionizable groups. These reactants will suitably contain one or two, more suitably two, isocyanate reactive groups, as well as at least one ionic or ionizable group. In the structural description of the hydroxyl terminated polyether polyurethanes described herein the reactant containing the ionic group is designated as $Z_2$.

Examples of ionic dispersing groups include carboxylate groups (—COOM), phosphate groups (—$OPO_3$ $M_2$), phosphonate groups (—$PO_3$ $M_2$), sulfonate groups (—$SO_3$ M), quaternary ammonium groups (—$NR_3$ Y, wherein Y is a monovalent anion such as chlorine or hydroxyl), or any other effective ionic group. M is a cation such as a monovalent metal ion (e.g., $Na^+$, $K^+$, $Li^+$, etc.), $H^+$, $NR_4^+$, and each $R_4$ can be independently an alkyl, aralkyl, aryl, or hydrogen. These ionic dispersing groups are typically located pendant from the polyurethane backbone.

The ionizable groups in general correspond to the ionic groups, except they are in the acid (such as carboxyl —COOH) or base (such as primary, secondary or tertiary amine —$NH_2$, —NRH, or —$NR_2$) form. The ionizable groups are such that they are readily converted to their ionic form during the dispersion/polymer preparation process as discussed below.

The ionic or potentially ionic groups are chemically incorporated into the hydroxyl terminated polyurethanes in an amount to provide an ionic group content (with neutralization as needed) sufficient to render the polyurethane dispersible in the aqueous medium of the dispersion. Typical ionic group content will range from about 10 up to about 60 milliequivalents (meq), specifically, from about 20 to about 50 meq. per 100 g of polyurethane of hydroxyl terminated polyurethanes.

Suitable compounds for incorporating these groups include (1) monoisocyanates diisocyanates which contain ionic and/or ionizable groups, and (2) compounds which contain both isocyanate reactive groups and ionic and/or ionizable groups. In the context of this disclosure, the term "isocyanate reactive groups" is taken to include groups well known to those of ordinary skill in the relevant art to react with isocyanates, and suitably hydroxyl, primary amino and secondary amino groups.

Examples of isocyanates that contain ionic or potentially ionic groups are sulfonated toluene diisocyanate and sulfonated diphenylmethanediisocyanate.

With respect to compounds which contain isocyanate reactive groups and ionic or potentially ionic groups, the isocyanate reactive groups are typically amino and hydroxyl groups. The potentially ionic groups or their corresponding ionic groups may be cationic or anionic, although the anionic groups are most suitable. Examples of anionic groups include carboxylate and sulfonate groups. Examples of cationic groups include quaternary ammonium groups and sulfonium groups.

In the case of anionic group substitution, the groups can be carboxylic acid groups, carboxylate groups, sulphonic acid groups, sulphonate groups, phosphoric acid groups and phosphonate groups. The acid salts are formed by neutralizing the corresponding acid groups either prior to, during or after formation of the NCO pre-polymer, suitably after formation of the NCO pre-polymer.

Suitable carboxylic group-containing compounds are the hydroxy-carboxylic acids corresponding to the structure $(HO)_jQ(COOH)_k$ wherein Q represents a straight or branched, hydrocarbon radical containing 1 to 12 carbon atoms, j is 1 or 2, suitably 2, and k is 1 to 3, more suitably 1 or 2 and most suitably 1.

Examples of these hydroxy-carboxylic acids include citric acid, tartaric acid and hydroxypivalic acid. Especially suitable acids are those of the above-mentioned structure wherein j=2 and k=1. These dihydroxy alkanoic acids are described in U.S. Pat. No. 3,412,054. Especially suitable dihydroxy alkanoic acids are the alpha, alpha-dimethylol alkanoic acids represented by the structural formula:

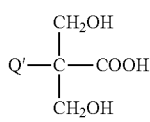

wherein Q' is hydrogen or an alkyl group containing 1 to 8 carbon atoms. The most suitable compound is alpha, alpha-dimethylol propionic acid, i.e., wherein Q' is methyl in the above formula.

In order to have a stable dispersion of the hydroxyl terminated polyurethane ink additive, a sufficient amount of the acid groups must be neutralized so that, the resulting polyurethane will remain stably dispersed in the aqueous medium. Generally, at least about 75%, suitably at least about 90%, of the acid groups are neutralized to the corresponding salt groups.

Suitable neutralizing agents for converting the acid groups to salt groups either before, during, or after their incorporation into the NCO pre-polymers, include tertiary amines, alkali metal cations and ammonia. Suitably trialkyl substituted tertiary amines, such as triethyl amine, tripropyl amine, dimethylcyclohexyl amine, and dimethylethyl amine.

Neutralization may take place at any point in the process. A typical procedure includes at least some neutralization of the pre-polymer.

When the ionic stabilizing groups are acids, the acid groups are incorporated in an amount sufficient to provide an acid group content for the urea-terminated polyurethane, known by those skilled in the art as acid number {AN}(mg KOH/gram solid polymer), at least about 10 milligrams KOH per 1.0 gram of polyurethane, and optionally 20 milligrams KOH per 1.0 gram of polyurethane. The upper limit for the acid number (AN) is about 50.

The hydroxyl number for these hydroxyl terminated polyurethane ink additives are between 5 and 50 mg KOH per gram of solid polymer. The hydroxyl terminated polyurethanes ink additive has a number average molecular weight of about 2000 to about 30,000. Suitably, the molecular weight is about 3000 to 20000.

The polyurethane ink additive is a generally stable aqueous dispersion of polyurethane particles having a solids content of up to about 60% by weight, specifically, about 15 to about 60% by weight and most specifically, about 30 to about 45% by weight. However, it is always possible to dilute the dispersions to any minimum solids content desired.

Other Isocyanate-Reactive Components

As indicated above, the polyether diol shown as $Z_1$ may be blended with other polyfunctional isocyanate-reactive components, most notably oligomeric and/or polymeric polyols.

Suitable other diols contain at least two hydroxyl groups, and have a molecular weight of from about 60 to about 6000. Of these, the polymeric other diols are best defined by the number average molecular weight, and can range from about 200 to about 6000, specifically, from about 400 to about 3000, and more specifically from about 600 to about 2500. The molecular weights can be determined by hydroxyl group analysis (OH number).

Examples of polymeric polyols include polyesters, polyethers, polycarbonates, polyacetals, poly(meth)acrylates, polyester amides, polythioethers and mixed polymers such as a polyester-polycarbonates where both ester and carbonate linkages are found in the same polymer. A combination of these polymers can also be used. For examples, a polyether polyol and a poly (meth) acrylate polyol may be used in the same polyurethane synthesis.

Suitable polyester polyols include reaction products of polyhydric, specifically, dihydric alcohols to which trihydric alcohols may optionally be added, and polybasic (suitably dibasic) carboxylic acids.

The polycarboxylic acids may be aliphatic, cycloaliphatic, aromatic and/or heterocyclic or mixtures thereof and they may be substituted, for example, by halogen atoms, and/or unsaturated.

Suitable polyether polyols that can be used in addition to the polyether diols of $Z_1$ are obtained in a known manner by reacting the starting compounds that contain reactive hydrogen atoms with alkylene oxides such as ethylene oxide, propylene oxide, butylene oxide, styrene oxide, tetrahydrofuran, epichlorohydrin or mixtures of these. The polyethers may not contain more than about 10% by weight of ethylene oxide units.

In addition to the above-mentioned components, which are difunctional in the isocyanate polyaddition reaction, monofunctional and even small portions of trifunctional and higher functional components generally known in polyurethane chemistry, such as trimethylolpropane or 4-isocyanatomethyl-1,8-octamethylene diisocyanate, may be used in cases in which branching of the NCO pre-polymer or polyurethane is desired.

It is, however, suitable that the NCO-functional pre-polymers should be substantially linear, and this may be achieved by maintaining the average functionality of the pre-polymer starting components at or below 2.1.

Polyisocyanate Component

Suitable polyisocyanates are those that contain either aromatic, cycloaliphatic or aliphatic groups bound to the isocyanate groups. Mixtures of these compounds may also be used. Suitable are compounds with isocyanates bound to a cycloaliphatic or aliphatic moieties. If aromatic isocyanates are used, cycloaliphatic or aliphatic isocyanates are present as well. $R_1$ can be substituted with aliphatic groups.

Diisocyanates are suitable, and any diisocyanate useful in preparing polyurethanes and/or polyurethane-ureas from polyether glycols, diisocyanates and diols or amine can be used in this invention.

Examples of suitable diisocyanates include, but are not limited to, 2,4-toluene diisocyanate (TDI); 2,6-toluene diisocyanate; trimethyl hexamethylene diisocyanate (TMDI); 4,4'-diphenylmethane diisocyanate (MDI); 4,4'-dicyclohexylmethane diisocyanate ($H_{12}$MDI); 3,3'-dimethyl-4,4'-biphenyl diisocyanate (TODI); Dodecane diisocyanate ($C_{12}$DI); m-tetramethylene xylylene diisocyanate (TMXDI); 1,4-benzene diisocyanate; trans-cyclohexane-1,4-diisocyanate; 1,5-naphthalene diisocyanate (NDI); 1,6-hexamethylene diisocyanate (HDI); 4,6-xylyene diisocyanate; isophorone diisocyanate (IPDI); and combinations thereof. IPDI and TMXDI are more suitable.

Small amounts, suitably less than about 3 wt % based on the weight of the diisocyanate, of monoisocyanates or polyisocyanates can be used in mixture with the diisocyanate. Examples of useful monoisocyanates include alkyl isocyanates such as octadecyl isocyanate and aryl isocyanates such as phenyl isocyanate. Examples of polyisocyanates are triisocyanatotoluene HDI trimer (Desmodur 3300), and polymeric MDI (Mondur MR and MRS).

Aqueous Vehicle

Selection of a suitable aqueous vehicle mixture depends on requirements of the specific application, such as desired surface tension and viscosity, the selected colorant, drying time of the ink, and the type of substrate onto which the ink will be printed. Representative examples of water-soluble organic solvents which may be utilized in the present invention are those that are disclosed in U.S. Pat. No. 5,085,698.

If a mixture of water and at least one water-miscible solvent is used, the aqueous vehicle typically will contain about 30% to about 95% water with the balance (i.e., about 70% to about 5%) being the water-soluble solvent. Compositions of the present invention may contain about 60% to about 95% water, based on the total weight of the aqueous vehicle.

The amount of aqueous vehicle in the ink is typically in the range of about 70% to about 99.8%, specifically about 80% to about 99.8%, based on total weight of the ink.

The aqueous vehicle can be made to be fast penetrating (rapid drying) by including surfactants or penetrating agents such as glycol ethers and 1,2-alkanediols. Suitable surfactants include ethoxylated acetylene diols (e.g. Surfynols® series from Air Products), ethoxylated primary (e.g. Neodol® series from Shell) and secondary (e.g. Tergitol® series from Union Carbide) alcohols, sulfosuccinates (e.g. Aerosol® series from Cytec), organosilicones (e.g. Silwet® series from Witco) and fluoro surfactants (e.g. Zonyl® series from DuPont).

The amount of glycol ether(s) and 1,2-alkanediol(s) added must be properly determined, but is typically in the range of from about 1 to about 15% by weight and more typically about 2 to about 10% by weight, based on the total weight of the ink. Surfactants may be used, typically in the amount of about 0.01 to about 5% and suitably about 0.2 to about 2%, based on the total weight of the ink.

Other Ingredients

Other ingredients may be formulated into the inkjet ink, to the extent that such other ingredients do not interfere with the stability and jetability of the ink, which may be readily determined by routine experimentation. Such other ingredients are in a general sense well known in the art.

Biocides may be used to inhibit growth of microorganisms. Inclusion of sequestering (or chelating) agents such as ethylenediaminetetraacetic acid (EDTA), iminodiacetic acid (IDA), ethylenediamine-di(o-hydroxyphenylacetic acid) (EDDHA), nitrilotriacetic acid (NTA), dihydroxyethylglycine (DHEG), trans-1,2-cyclohexanediaminetetraacetic acid (CyDTA), diethylenetriamine-N,N,N',N'',N''-pentaacetic acid (DTPA), and glycoletherdiamine-N,N,N',N'-tetraacetic acid (GEDTA), and salts thereof, may be advantageous, for example, to eliminate deleterious effects of heavy metal impurities.

Proportion of Main Ingredients

The self-dispersed pigment levels employed in the instant inks are those levels which are typically needed to impart the desired color density to the printed image. Typically, self-dispersed pigment levels are in the range of about 0.05 to about 10% by weight of the ink. The hydroxyl terminated polyurethane ink additive is added as a distinct additive to the ink at the time the ink is formulated. The various ink components including the hydroxyl terminated polyurethane ink additive can be added together in any convenient order.

The amount of hydroxyl terminated polyurethane ink additive used in the inks is dictated by the degree of fixation sought and the range of ink properties which may be tolerated. Typically, polyurethane dispersion levels will range up to about 5 weight %, suitably from about 0.1 to about 5%, more suitably about 0.2 to about 4% by weight of total ink composition. The hydroxyl terminated polyurethane ink additive provides some degree of improved ink fixation onto the substrate. Better fixation is obtained at higher levels, but generally, at some point, viscosity is increased excessively and jetting performance becomes unacceptable. The right balance of properties must be determined for each circumstance, which determination may generally be made by routine experimentation well within the skill of those of ordinary skill in the art.

The weight ratio of the hydroxyl terminated polyurethane ink additive to self-dispersed pigment is from 0.05 to 0.50. Optionally, the ratio can be from 0.1 to 0.35.

Ink Properties

Jet velocity, separation length of the droplets, drop size and stream stability are greatly affected by the surface tension and the viscosity of the ink. Pigmented ink jet inks typically have a surface tension in the range of about 20 dyne/cm to about 70 dyne/cm at 25° C. Viscosity can be as high as 30 cP at 25° C., but is typically somewhat lower. The ink has physical properties compatible with a wide range of ejecting conditions, i.e., driving frequency of the piezo element, or ejection conditions for a thermal head, for either a drop-on-demand device or a continuous device, and the shape and size of the nozzle. The inks should have excellent storage stability for long periods so as not to clog to a significant extent in an ink jet apparatus. Further, the ink should not corrode parts of the ink jet printing device it comes in contact with, and it should be essentially odorless and non-toxic.

Although not restricted to any particular viscosity range or printhead, the inventive ink set is particularly suited to lower viscosity applications such as those required by thermal printheads. Thus the viscosity (at 25° C.) of the inventive inks can be less than about 7 cP, is suitably less than about 5 cP, and most suitably is less than about 3.5 cP. Thermal inkjet actuators rely on instantaneous heating/bubble formation to eject ink drops and this mechanism of drop formation generally requires inks of lower viscosity.

Substrate

The instant invention is particularly advantageous for printing on plain paper, such as common electrophotographic copier paper and photo paper, glossy paper and similar papers used in inkjet printers.

EXAMPLES

Extent of Polyurethane Reaction

The extent of polyurethane reaction was determined by detecting NCO % by dibutylamine titration, a common method in urethane chemistry. In this method, a sample of the NCO containing pre-polymer is reacted with a known amount of dibutylamine solution and the residual amine is back titrated with HCl. The hydroxyl terminated polyurethane ink additive should have no detectable NCO.

Particle Size Measurements

The particle size for the polyurethane dispersions, pigments and the inks were determined by dynamic light scattering using a MICROTRAC UPA 150 analyzer from Honeywell/Microtrac (Montgomeryville, Pa.).

This technique is based on the relationship between the velocity distribution of the particles and the particle size. Laser generated light is scattered from each particle and is Doppler shifted by the particle Brownian motion. The frequency difference between the shifted light and the unshifted light is amplified, digitalized and analyzed to recover the particle size distribution.

The reported numbers below are the volume average particle size.

Solid Content Measurement

Solid content for the solvent free polyurethane dispersions was measured with a moisture analyzer, model MA50 from Sartorius. For polyurethane dispersions containing high boiling solvent, such as NMP, tetraethylene glycol dimethyl ether, the solid content was then determined by the weight differences before and after baking in 150° C. oven for 180 minutes.

MW Characterization of the Polyurethane Additive

All molecular weights were determined by GPC using poly (methyl methacrylate) standards with tetrahydrofuran as the eluent. Using statics derived by Flory, the molecular weight of the polyurethane may be calculated or predicted based on the NCO/OH ratio and the molecular weight of the monomers. Molecular weight is also a characteristic of the polyurethane that can be used to define a polyurethane. The molecular weight is routinely reported as number average molecular weight, Mn. For the hydroxyl terminated polyurethanes ink additive a suitable molecular weight range is 2000 to 30000, or more suitable 3000 to 20000. The polyurethane additives are not limited to the Gaussian distribution of molecular weight, but may have other distributions such as bimodal distributions.

Polyurethane Ink Additive Example 1 IPDI/T650/DMPA AN45

A 2 L reactor was loaded with 232.9 g Terathane® 650, 111.8 g sulfolane, and 45.3 g dimethylol propionic acid. The mixture was heated to 115° C. with $N_2$ purge for 60 min. Then the reaction was cooled to 75° C. Over 60 minutes 141.9 g isophorone diisocyanate was added followed by 24.6 g sulfolane. The reaction was held at 90° O for 9 hrs, and during this time 39 g of sulfolane, was added to reduce the viscosity. At this time, the % NCO was below 0.2%, and the polyurethane solution was inverted under high speed mixing by adding a mixture of 45% KOH (37.9 g) and 306.2 g water followed by additional 604.9 g water. The polyurethane dispersion had a viscosity of 43.6 cPs, 27.98% solids, pH of 7.95, particle size of d50=9.4 nm and d95=162 nm.

Polyurethane Ink Additive Example 2 IPDI/T650/DMPA AN45

A 2 L reactor was loaded with 230.7 g Terathane® 650, 204.5 g sulfolane, and 45.2 g dimethylol propionic acid. The mixture was heated to 115° C. with $N_2$ purge for 60 min. Then the reaction was cooled to 75° C. Over 60 minutes 144.1 g isophorone diisocyanate was added followed by 24.1 g sulfolane. The reaction was held at 90° C. for 9 hrs. At this time, the % NCO was below 0.2%, and the polyurethane solution was inverted under high speed mixing by adding a mixture of 45% KOH (37.9 g) and 354.3 g water followed by additional 460.6 g water. The polyurethane dispersion had 28.5% solids, pH of 7.56, and molecular weight by GPC of Mn 17658 and Pd 1.78.

Polyurethane Ink Additive Example 3 IPDI/PO3G 6501DMPA

A 2 L reactor was loaded with 239.9 g PO3G 650, 107.7 g sulfolane, and 43.7 g dimethylol propionic acid. The mixture was heated to 115° C. with $N_2$ purge for 60 min. Then the reaction was cooled to 75° C. Over 60 minutes 136.4 g isophorone diisocyanate was added followed by 22.6 g sulfolane. The reaction was held at 90° C. for 6 hrs. At this time, the % NCO was below 0.2%, and the polyurethane solution was inverted under high speed mixing by adding a mixture of 45% KOH (36.5 g) and 296.2 g water followed by additional 622.3 g water. The polyurethane dispersion had a viscosity of 59.7 cPs, 28.64% solids, pH of 7.63, and molecular weight by GPC of Mn 16954 and Pd 1.87.

Polyurethane Ink Additive Example 4 IPDI/PO3G 650/DMPA AN30

A 2 L reactor was loaded with 260.52 g PO3G 650, 151.9 g sulfolane, and 30.9 g dimethylol propionic acid. The mixture was heated to 115° C. with $N_2$ purge for 60 min. Then the reaction was cooled to 75° C. Over 60 minutes 128.8 g isophorone diisocyanate was added followed by 21.2 g sulfolane. The reaction was held at 90° C. for 16 hrs., and during this time, 52 g sulfolane was added to reduce the viscosity. At this time, the % NCO was below 0.2%, and the polyurethane solution was inverted under high speed mixing by adding a mixture of 45% KOH (25.7 g) and 207.6 g water followed by additional 676.2 g water. The polyurethane dispersion had a viscosity of 97.4 cPs, 27.22% solids, pH of 7.76, particle size of d50=7.43 nm and d95=12.75 nm, and molecular weight by GPC Mn 15620 and Pd 1.98.

Polyurethane Ink Additive Example 5 IPDI/PO3G 650/DMPA AN30

A 2 L reactor was loaded with 265.5 g PO3G 650, 75.2 g sulfolane, and 30.5 g dimethylol propionic acid. The mixture was heated to 115° C. with $N_2$ purge for 60 min. Then the reaction was cooled to 75° C., and 0.2 g dibutyl tin dilaurate was added. Over 60 minutes 124.1 g isophorone diisocyanate was added followed by 20.4 g sulfolane. The reaction was held at 90° C. for 9 hrs, and during this time, 51 g sulfolane was added to reduce the viscosity. At this time, the % NCO was below 0.2%, and the polyurethane solution was inverted under high speed mixing by adding a mixture of 45% KOH (25.5 g) and 204.6 g water followed by additional 755.2 g water. The polyurethane dispersion had a viscosity of 67.4 cPs, 27.46% solids, pH of 7.53, and molecular weight by GPC of Mn 14058 and Pd 2.06.

Comparative Additive Polymer 1 ETEGMA/BZMA//MAA 3.6/113.61/10.8

A 3-liter flask was equipped with a mechanical stirrer, thermometer, $N_2$ inlet, drying tube outlet, and addition funnels. Tetrahydrofuran THF, 291.3 gm, was charged to the flask. The catalyst tetrabutyl ammonium m-chlorobenzoate, 0.44 ml of a 1.0 M solution in acetonitrile, was then added. Initiator, 1,1-bis (trimethylsiloxy)-2-methyl propene, 20.46 gm (0.0882 moles) was injected. Feed I [tetrabutyl ammonium m-chlorobenzoate, 0.33 ml of a 1.0 M solution in acetonitrile and THF, 16.92 gm] was started and added over 185 minutes. Feed H [trimethylsilyl methacrylate, 152.00 gm (0.962 moles)] was started at 0.0 minutes and added over 45 minutes. One hundred and eighty minutes after Feed II was completed (over 99% of the monomers had reacted) Feed III [benzyl methacrylate, 211.63 gm (1.20 moles) was started and added over 30 minutes. Forty minutes after Feed III was completed (over 99% of the monomers had reacted) Feed IV [ethoxytriethyleneglycol methacrylate, 78.9 gm (0.321 moles) was started and added over 30 minutes.

At 400 minutes, 73.0 gm of methanol and 111.0 gm of 2-pyrrolidone was added to the above solution and distillation began. During the first stage of distillation, 352.0 gm of material was removed. Then more 2-pyrrolidone 340.3 gm was added and an additional 81.0 gm of material was distilled out. Finally, 2-pyrrolidone, 86.9 gm total, was added. The final polymer was at 40.0% solids.

The polymer has a composition of ETEGMA//BZMA//MAA 3.6/113.61/10.8. It has a molecular weight of Mn=4,200, acid number 162.

Comparative Additive Polymer 2

A 3-liter flask was equipped with a mechanical stirrer, thermometer. N2 inlet, drying tube outlet, and addition funnels. Tetrahydrofuran THF, 844.00 g, was charged to the flask. Initiator, 1,1-bis (trimethylsiloxy)-2-methyl propene, 40.10 g (0.1728 moles) was added, and then, the catalyst tetrabutyl ammonium m-chlorobenzoate, 1.33 ml of a 1.0 M solution in acetonitrile, was then added. Feed I [tetrabutyl ammonium m-chlorobenzoate, 1.1 ml of a 1.0 M solution in acetonitrile and THF, 7.00 g] was started and added concurrently with the other feeds. Feed II [trimethylsilyl methacrylate, 161.10 g (1.22 moles), 2-ethyl hexyl methacrylate, 526.50 g (2.659 moles), ethoxytriethyleneglycol methacrylate, 268.10 g (1.089 moles) was started at 0.0 minutes and added over 120 minutes. After another 60 minutes, the polymerization was complete with over 98% of the monomers converted by HPLC.

Methanol (168.5 g) was added to the above solution. Then, the THF and other volatile by-products were distillated by slowly heating to 120° C. while 2 P was added. The final polymer solution was 43.0% solids with a measured acid value of 1.53 mEq/g and an acid number of 85.66. The polymer has a composition of EHMA/ETEGMA/MAA 15.6/5.9/6.2 with a molecular weight of Mn=5,200.

Comparative Additive Polymer 3 Polycarbonate with AN60

A 2 L reactor was loaded with 175 g Eternacoll UHSO (Ube polycarbonate dial, MW=501), 132.0 g tetraethylene glycol dimethyl ether, and 69.0 g dimethylol propionic acid. The mixture was heated to 115° C. for 1 hr. Then the reaction was cooled to 60° C. and 4 drops dibutyl tin dilaurate was added. Over 5 minutes 212 g isophorone diisocyanate was added followed by 15.0 g tetraethylene glycol dimethyl ether. The reaction was held at 80° C. for 8 hrs when the % NCO was 1.2%. Then, 23.95 g bis(2-methoxy ethyparnine was added over 5 minutes. After 1 hr at 80° C., the polyurethane solution was inverted under high speed mixing by adding a mixture of 45% KOH (57.7 g) and 807.4 g water at 80° C. followed by an additional 422.8 g water at 80° C. The polyurethane dispersion had a viscosity of 23.0 cPs, 17.5% solids, and pH 9.15.

Comparative Additive Polymer 4 IPDI/T650/DMPA AN60

This preparation was identical to polyurethane ink additive Example 1 with additional di ethylol propionic acid replacing some of the Terathane 650 to adjust the final acid number of the polyurethane to 60 mg KOH/g polymer while maintaining the same NCO/OH ratio. The polyurethane dispersion had a viscosity of 45.1 cPs at 26.37% solids, pH of 7.70, particle size of d50=13.1 nm and d95=21.6 nm, and molecular weight by GPC of Mn 13809 and Pd 2.01.

Comparative Additive Polymer 5 TDI/PO3G 650/DMPA AN60, E112913-128)

This preparation was identical to polyurethane ink additive Example 3 using toluene diisocyanate instead of isophorone diisocyanate and with additional dimethylol propionic acid replacing some of the Terathane 650 to increase the final acid number of the polyurethane to 60 mg KOH/g polymer while adjusting for molecular weight differences to maintaining the same NCO/OH ratio. The polyurethane dispersion had a 2873% solids and molecular weight by GPC Mn 9270 and Pd 2.49.

Self-Dispersed Black Pigment

The Self-Dispersed Pigment was prepared by methods described in previously referred to U.S. Pat. No. 6,852,156 (see Example 3). Self-dispersed pigment Sample 1 used Nipex 160 from Degussa with a lithium hydroxide neutralization and self-dispersed pigment Sample 2 used Nipex 180 from Degussa with a potassium neutralization.

Preparation of Inks with Self-Dispersed Pigment and Polyurethane Ink Additives

Inks were prepared using the Polyurethane Ink Additives and Comparative Polymers. Table 1 shows the compositions

TABLE 1

Inventive Inks, Polyurethane Ink Additives

| Ink Example | Polyurethane additive | Acid Number | NCO | Polyether Diol |
|---|---|---|---|---|
| Ex 1 | 1 | 45 | IPDI | PO4G |
| Ex 2 | 2 | 45 | IPDI | PO4G |
| Ex 3 | 3 | 45 | IPDI | PO3G |
| Ex 4 | 4 | 30 | IPDI | PO4G |
| Ex 5 | 5 | 30 | IPDI | PO3G |
| Ex 6 | 2 | 45 | IPDI | PO4G |

TABLE

Comparative Inks, Comparative Polymers

| Comparative Ink Example | Comparative Polymer additive | Acid Number | NCO | Diol |
|---|---|---|---|---|
| CE 1 | none | — | — | — |
| CE 2 | 1 | — | — | — |
| CE 3 | 2 | — | — | — |
| CE 4 | 3 | 60 | IPDI | UB500 |
| CE 5 | 4 | 60 | TDI | PO3G |
| CE 6 | 5 | 60 | IPDI | PO4G |

The inks were prepared by combining the components as described in Tables 1 and 2. Percent refers to the active solids. All amounts shown are in weight percent.

| Carbon Black Pigment | 2 to 4% |
|---|---|
| Polymer additive | 0 to 3% |
| Vehicle A | |
| Pyrrolidone | 10% |
| Ethoxylated glycerol | 4% |
| Surfactants | 0.2% |
| Biocide | 0.25% |
| Water | Balance to 100% |
| Vehicle B | |
| Hydroxyethyl Pyrrolidone | 1.5% |
| Ethoxylated glycerol | 4.5% |
| Danthacol | 8% |
| Surfactants | 1.5% |
| Biocide | 0.25% |
| Water | Balance to 100% |

TABLE 3

Inventive and Comparative Ink Formulation

| Ink Example | Pigment | Additive, wt % | Additive type | Vehicle type | Self-Dispersed Pigment example |
|---|---|---|---|---|---|
| Ex 1 | 4 | 2 | 1 | A | 1 |
| Ex 2 | 4 | 2 | 2 | A | 1 |
| Ex 3 | 4 | 2 | 3 | A | 1 |
| Ex 4 | 4 | 2 | 4 | A | 1 |
| Ex 5 | 4 | 2 | 5 | A | 1 |
| Ex 6 | 4 | 2 | 2 | B | 1 |
| CE 1 | 4 | None | | A | 1 |
| CE 2 | 4 | 2 | 1 | A | 1 |
| CE 3 | 4 | 2 | 2 | A | 1 |
| CE 4 | 2.5 | 1 | 3 | B | 2 |
| CE 5 | 2.5 | 1 | 4 | B | 2 |
| CE 6 | 2.5 | 1 | 5 | B | 2 |

Inks prepared were printed on three different papers: Hammermill™ Copy Plus, Xerox™ 4200 and Hewlett-Packard™ Multipurpose with ColorLok®.

Printing was done on a thermal ink jet printer DeskJet™ 6122 from Hewlett Packard (San Diego, Calif.) using the HP45A printhead in the black cartridge holder. The printing was done in the standard normal print mode selected by printer.

The optical density was measured using a Greytag-Macbeth SpectoEye™ instrument (Greytag-Macbeth AG, Regensdorf, Switzerland).

The durability of the image towards highlighter smear was done using a Faber-Castel highlighter pen after the printed image was allowed to dry for about an hour after printing. The image was marked once and also twice with the highlighter. The amount of ink transfer into the unprinted area by the highlighter pen was noted by visual inspection and rated on a scale of 1 to 5 with 5 being best. The 5 rating has little if any smearing of the printed image with the highlighter.

Print data reported is reported in Table 5 with both the inventive and comparative inks listed are average of multiple measurements. For optical density and durability, the average was measured on three paper types: Hammermill™ Copy Plus, HP Multipurpose with ColorLok® and Xerox™ 4200. In all cases, higher values indicate higher level and better performance.

Thermal ink jet drop ejection reliability reported was determined by the weight of the ink drops when the inks were fired from a HP45A printhead at a frequency of 12 kHz. The reported reliability is a combination of the ink weight of the ink drops and the consistency of the ink drops—if the ink drops vary a lot then the ink is rated poorer. The comparison for this ink jet reliability is to Comparative Ink 2 which is considered an excellent ink in this test.

TABLE 4

Print Results for Inventive and Comparative Inks

| Ink Example | Optical Density | Highlighter Durability | Drop Ejection Reliability |
|---|---|---|---|
| Ex 1 | 1.4 | 2.8 | 4 |
| Ex 2 | 1.4 | 2.8 | 4.5 |
| Ex 3 | 1.42 | 2.6 | 4 |
| Ex 4 | 1.39 | 3.3 | 3 |
| Ex 5 | 1.41 | 2.9 | 2 |
| Ex 6 | 1.36 | 3.2 | 4 |
| CE 1 | 1.49 | 1.8 | 4.5 |
| CE 2 | 1.44 | 1.8 | 5 |
| CE 3 | 1.45 | 2 | 4.5 |
| CE 4 | 1.33 | 3.3 | 4.5 |
| CE 5 | 1.39 | ND | 4.5 |
| CE 6 | 1.24 | ND | 4.5 |

Addition of the Polyurethane Ink Additive polymer significantly improved the durability of an ink that either contains no polymer additive, or if the polymer is an acrylic based material. The other performance parameters optical density and drop ejection reliability were nearly as good as Comparison Ink 2. Inventive Examples 4 and 5 have poorer drop ejection reliability, but this may be due to an unoptimized combination of the self-dispersed pigment and the Polyurethane Ink Additive.

Ink storage stability was evaluated by following the change in particle size by Nanotrac (Microtrac Inc., Montgomeryville, Pa.) both before and after 7 days storage at 70° C. as well as after subjecting ink to temperature cycle from 4 hours at −40° C. to 4 hours+70° C. for total of four cycles. In general, small decrease or small changes of 10% or less in particle size is acceptable and indicates relative pigment dispersion stability. Particle size increase larger than 10% is generally taken due to a significant agglomeration of the pigment particles. Large increase in particle size indicates a reduction in storage stability due to the additives.

TABLE 6

Ink Stability Results for Inventive and Comparative Inks

| Ink Example | Particle Size | | Change in D95 | |
| | Initial D50, nm | Initial D95, nm | After 7 days at 70 C. | Temperature Cycles |
|---|---|---|---|---|
| Ex 1 | 106 nm | 172 nm | 2% | −11% |
| Ex 2 | 105 nm | 172 nm | −2% | −13% |
| Ex 3 | 103 nm | 191 nm | −11% | −18% |
| Ex 4 | 106 nm | 172 nm | −4% | 8% |
| Ex 5 | 103 nm | 177 nm | −7% | −7% |
| Ex 6 | 108 nm | 199 nm | 2% | −10% |
| CE 1 | 106 nm | 162 nm | 5% | 5% |
| CE 2 | 106 nm | 172 nm | 0% | −14% |
| CE 3 | 108 nm | 166 nm | 6% | −4% |
| CE 4 | 128 nm | 220 nm | 8% | 22% |
| CE 5 | 125 nm | 209 nm | −3% | −1% |
| CE 6 | 131 nm | 210 nm | 24% | −8% |

The inventive Ink Examples, especially for the 7 day at 70° C., are comparable or better than the comparative Examples.

The invention claimed is:

1. An aqueous inkjet ink composition comprising:
   a. a self-dispersed pigment colorant;
   b. an aqueous vehicle; and
   c. a hydroxyl terminated polyurethane comprising a polyether diol, a diol substituted with an ionic group, and isocyanates,
   wherein the polyether diol is $Z_1$

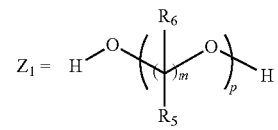

wherein p is greater than or equal to 2;
   m is 3 to about 12;
   each $R_5$ and $R_6$ is independently selected from the group consisting of hydrogen, alkyl, substituted alkyl, and aryl; each $R_5$ or $R_6$ is the same or different, and $R_5$ and $R_6$ may be optionally joined to form a cyclic structure;
   the diol substituted with an ionic group is $Z_2$, and at least one $Z_1$ and at least one $Z_2$ must be present in the polyurethane composition;
   equivalents of isocyanate reactive groups derived from the $Z_1$ and $Z_2$ are greater than isocyanate groups leading to hydroxyl terminated polyurethanes;
   and wherein the polyurethane has an acid number of at least 10 to 50.

2. The aqueous inkjet ink composition of claim 1, wherein the hydroxyl terminated polyurethane is from about 0.1 to about 5%, by weight based on the weight of the total ink composition.

3. The aqueous inkjet ink composition of claim 1, wherein the hydroxyl terminated polyurethane is from 0.2 to 4% by weight based on the weight of the total ink composition.

4. The aqueous inkjet ink composition of claim 1, having from 0.1 to 10 weight percent self-dispersed pigment colorant based on the total weight of the ink, a surface tension in the range of 20 dyne/cm to 70 dyne/cm at 25° C., and a viscosity of lower than 30 cP at 25° C.

5. The aqueous inkjet ink composition of claim 1, wherein the self-dispersed pigment colorant is self-dispersed carbon black pigment comprising anionic hydrophilic chemical groups.

6. The aqueous inkjet ink of claim 5, wherein the anionic hydrophilic chemical groups on the self-dispersed carbon black pigment comprise carboxyl groups.

7. The aqueous inkjet ink composition of claim 1, wherein the self-dispersed pigment comprises a pigment that has been oxidatively treated on its surface with hypochlorous acid, sulfonic acid, or ozone so as to bond at least one functional group selected from the group consisting of carbonyl, carboxyl, hydroxyl and sulfone, onto the surface of the pigment.

8. The aqueous inkjet ink composition of claim 1 or 7, wherein the self-dispersed pigment colorant comprises a pigment that has been oxidatively treated on its surface with ozone.

9. The aqueous inkjet ink composition of claim 1, where the self-dispersed pigment comprises a degree of functionalization of less than 3.5 μmoles per square meter of pigment surface (3.5 μmol/m2).

10. The aqueous inkjet ink composition of claim 1, wherein the self-dispersed pigment comprises a degree of functionalization of less than 3.0 μmoles per square meter of pigment surface (3.0 μmol/m2).

11. The aqueous inkjet ink composition of claim 1, where the weight ratio of the hydroxyl terminated polyurethane to the self-dispersed colorant is at least 0.05 and at most 0.50.

12. The aqueous inkjet ink composition of claim 1, where the self-dispersed colorant has a d50 particle size of 75 to 250 nanometers.

13. The aqueous inkjet ink composition of claim 1, wherein the aqueous vehicle is a mixture of water and at least one water-miscible solvent.

14. A method of ink jet printing onto a substrate is provided comprising, in any workable order, the steps of:
 a. providing an ink jet printer that is responsive to digital data signals;
 b. loading the printer with a substrate to be printed;
 c. loading the printer with the aqueous inkjet ink composition of claim 1;
 d. printing onto the substrate using the aqueous ink jet ink, in response to the digital data signals to form a printed image on the substrate.

15. The aqueous inkjet ink of claim 1 having a drop ejection reliability of 4 or better.

16. An inkjet ink set wherein at least one of the inks in the inkjet ink set is an aqueous inkjet ink composition comprising:
 a. a self-dispersed pigment colorant;
 b. an aqueous vehicle; and
 c. a hydroxyl terminated polyurethane comprising a polyether diol, a diol substituted with an ionic group, and isocyanates,
wherein the polyether diol is $Z_1$

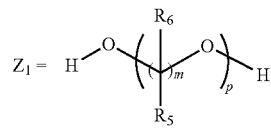

wherein p is greater than or equal to 2;
m is 3 to about 12;
each $R_5$ and $R_6$ is independently selected from the group consisting of hydrogen, alkyl, substituted alkyl, and aryl; each $R_5$ or $R_6$ is the same or different, and $R_5$ and $R_6$ may be optionally joined to form a cyclic structure;
the diol substituted with an ionic group is $Z_2$, and at least one $Z_1$ and at least one $Z_2$ must be present in the polyurethane composition;
equivalents of isocyanate reactive groups derived from the $Z_1$ and $Z_2$ are greater than isocyanate groups leading to hydroxyl terminated polyurethanes;
and the polyurethane has an acid number of at least 10 to 50.

17. A method of ink jet printing onto a substrate is provided comprising, in any workable order, the steps of:
 a. providing an ink jet printer that is responsive to digital data signals;
 b. loading the printer with a substrate to be printed;
 c. loading the printer with the aqueous inkjet ink set of claim 16;
 d. printing onto the substrate using the aqueous ink jet ink set, in response to the digital data signals to form a printed image on the substrate.

* * * * *